United States Patent [19]
Earle

[11] 3,904,948
[45] Sept. 9, 1975

[54] SOURCE SENSING BATTERY CHARGER

[76] Inventor: John L. Earle, 4024 Hempstead Cir., San Diego, Calif. 92116

[22] Filed: Nov. 18, 1974

[21] Appl. No.: 524,570

[52] U.S. Cl. ............... 320/13; 307/10 BP; 320/39; 320/64; 322/69; 322/100
[51] Int. Cl.² ................... H02J 7/00; H02J 7/14
[58] Field of Search ............ 322/27, 28, 69, 70, 35, 322/100; 320/39, 40, 48, 61, 64, 68, 72, 13, 14; 290/1 R, 55; 317/9 B; 307/10 BP, 131, 132

[56] References Cited
UNITED STATES PATENTS

| | | | |
|---|---|---|---|
| 1,995,946 | 3/1935 | Schild | 307/10 BP X |
| 2,148,804 | 2/1939 | Claytor | 322/35 X |
| 3,300,702 | 1/1967 | Noddin | 322/69 |
| 3,351,812 | 11/1967 | Cutler et al. | 322/69 X |
| 3,621,333 | 11/1971 | Gilchrist et al. | 317/9 B X |
| 3,795,818 | 3/1974 | Beaman et al. | 320/39 X |
| 3,835,363 | 9/1974 | Kirk | 322/28 X |

Primary Examiner—J. D. Miller
Assistant Examiner—Robert J. Hickey
Attorney, Agent, or Firm—Richard K. Macneill

[57] ABSTRACT

A source sensing battery charger in which the source is an electrical alternator or generator which varies in speed and could sometimes be stopped, such as an alternator or generator in a vehicle or coupled to a windmill, in which the charging current is sensed and utilized to enable a field current driver amplifier to the alternator or generator and to disable a test pulse generator. If the charging current drops to zero, the field current driver amplifier is disabled and a test pulse generator is enabled which periodically turns on the field current driver amplifier for a further sensing of the charged current. If a charged current is sensed, the test pulse generator is disabled and the field current driver amplifier is enabled, restoring field current to the alternator or generator and charging current to the battery.

4 Claims, 2 Drawing Figures

SOURCE SENSING BATTERY CHARGER

BRIEF DESCRIPTION OF THE INVENTION

The present invention relates to a source sensing battery charger and more particularly to a source sensing battery charger which prevents reverse current drain on a battery when the source is not supplying charging current.

According to the invention, source sensing battery charging apparatus is provided which periodically senses the charging source, such as an alternator or generator, for a positive charging current to the battery. If a charging current is detected, field current is continued to be supplied to the field of the alternator or generator sustaining the charging current. If no charging current is sensed, then the field current driver amplifier source is disabled and a test pulse generator is enabled which periodically turns on the field current driver amplifier source supplying field current to the alternator or generator and the charging current to the battery is sensed again. If no positive charging current is sensed, the field current of the alternator or generator is again turned off awaiting the next interrogating pulse from the test pulse generator. When a charging current is sensed during the period of a test pulse interrogation, the test pulse generator is disabled and the field current driver amplifier source is enabled, restoring sustaining charging current from the alternator or generator to the battery. Hence, reverse drain on the battery is held to an absolute minimum (during the period of a test pulse interrogation), during periods where the output from the charging source, i.e., alternator or generator, has dropped in amplitude to the point where positive charging current is not sustained, reducing overall drain on the battery. This is essential for certain applications such as utilizing a windmill as the prime mover of the alternator or generator, and in some applications can be useful in a vehicle electrical system. It is to be understood that in this application the terms generator and alternator are to be considered as equivalents.

An object of the present invention is the provision of a source sensing battery charger.

Another object of the invention is the provision of a battery charger which reduces battery drain during non-charging periods.

A further object of the invention is the provision of a battery charger for utilization with irregular prime movers.

Yet another object of the invention is the provision of a source sensing battery charger which can be operated in unattended situations.

A still further object of the invention is the provision of a source sensing battery charger which is inexpensive to manufacture and requires a minimum of maintenance and adjustment.

Other objects and many of the attendant advantages of the present invention will be readily appreciated as the same becomes better understood by reference to the following detailed description when considered in connection with the accompanying drawing in which like reference numerals designate like parts throughout the Figures thereof and wherein:

FIG. 1 is a system block diagram of the preferred embodiment of the present invention; and FIG. 2 is a schematic diagram of the embodiment of FIG. 1.

DETAILED DESCRIPTION OF THE DRAWING

Figure 1:
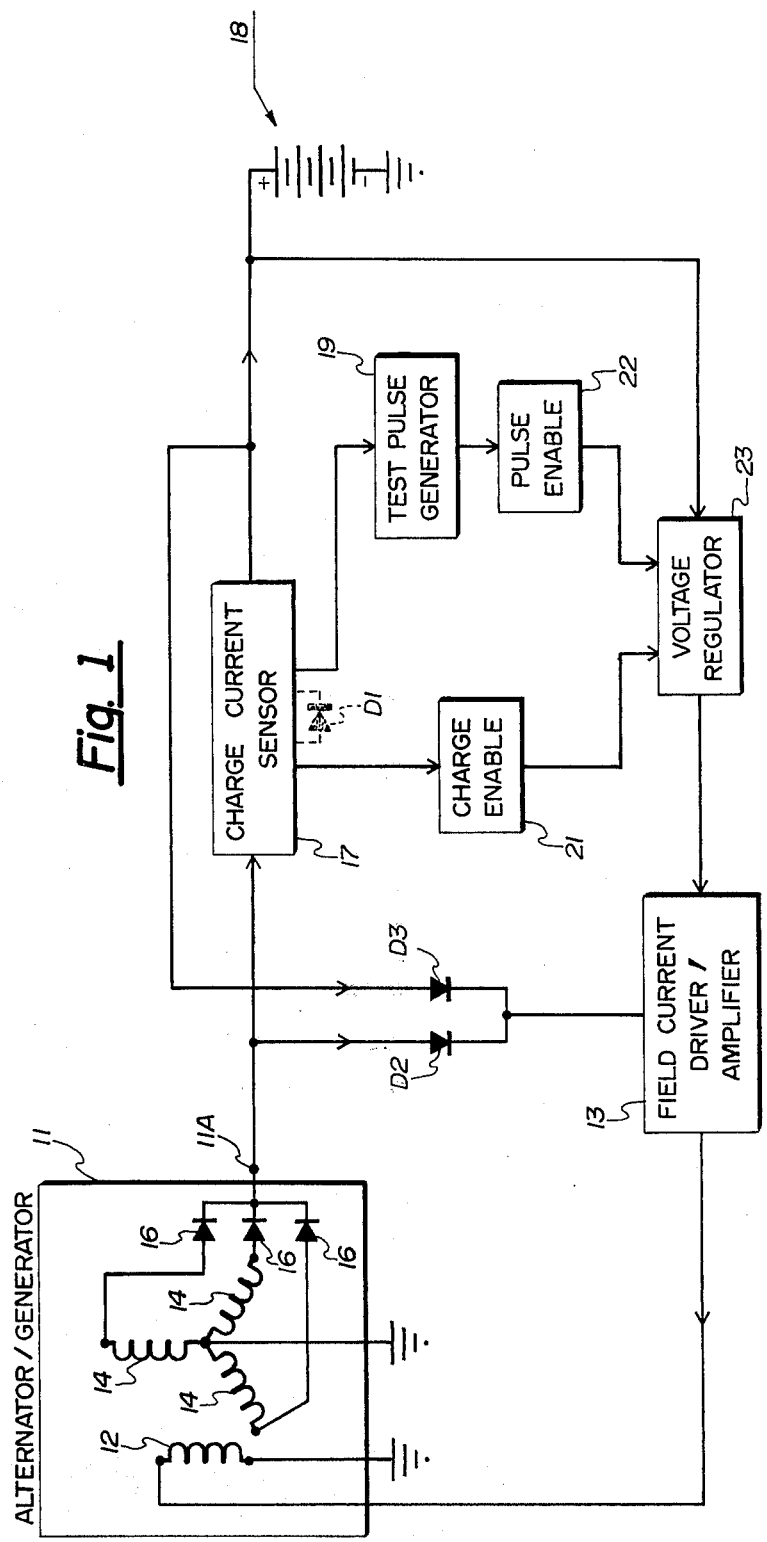

Referring to FIG. 1, an alternator is shown at 11 having a field winding 12 coupled between ground and the output of a field current driver amplifier 13. Output windings 14 of alternator 11 are coupled through rectifiers 16 to the input of charge current sense block 17 and through diode D-2 to an input of field current driver amplifier 13. The output of charge current sense block 17 is coupled to a positive terminal battery 18. A diode D-1 is illustrated within charge sense block 17. Charge current sense block 17 has one output coupled to test pulse generator 19 and another output coupled to charge enable block 21. An output of test pulse generator 19 is coupled to the pulse enable block 22. The outputs of charge enable block 21 and pulse enable block 22 are coupled to inputs of voltage regulator 23. Voltage regulator 23 has another input coupled to positive terminal of battery 18. The output of voltage regulator 23 is coupled to an input of field current driver amplifier 13.

Figure 2:
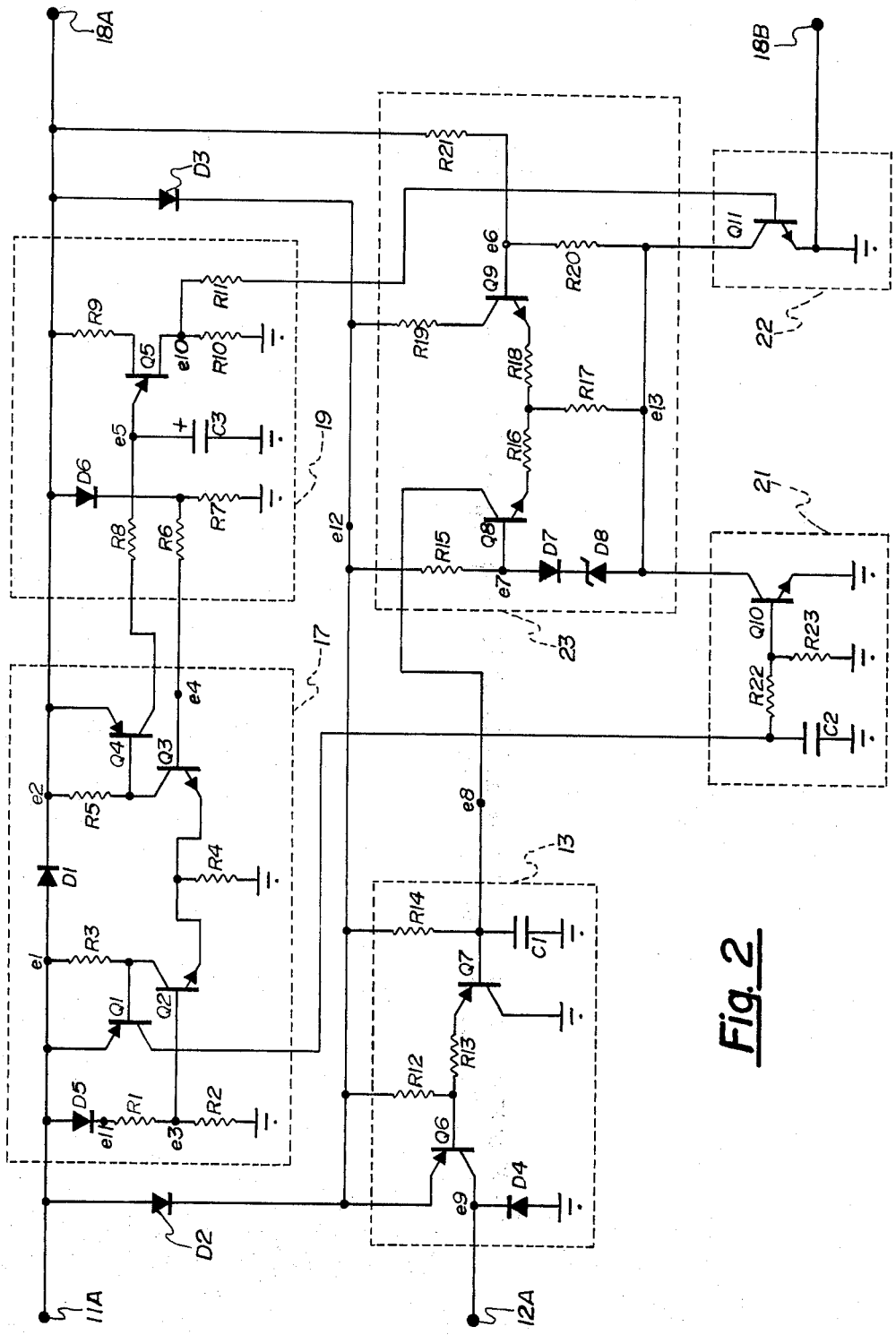

Referring to FIG. 2, alternator/generator output terminal 11A is coupled through diode D-1 to the positive battery terminal 18A, and through diode D-2 to the emitter of transistor Q-6 through resistance R-12 to the base of transistor Q-9 through resistor R-14 to the base transistor Q-7 and to the collector of transistor Q-8, and through resistor R-19 to the collector of transistor Q-9. Diode D-3 is coupled between the positive terminal of the battery 18A and the cathode of diode D-2. The anode of diode D-1 is coupled to the anode of diode D-5, the cathode of which is coupled through resistor R-1 to the base transistor Q-2 and to ground. The anode of diode D-1 is also connected to the emitter of transistor Q-1 and through resistor R-3 to the base of transistor Q-1 and the collector transistor Q-2. The emitters of transistors Q-2 and Q-3 are coupled together and through resistance R-4 to ground. The cathode of diode D-1 is coupled through resistor R-5 to the base of transistor Q-4 and the collector of transistor Q-3. The cathode of diode D-1 is also coupled to the emitter of transistor Q-4 and the anode of diode D-6, the cathode of which is coupled through resistance R-6 to the base of transistor Q-3 and through resistance R-7 to ground. The collector of transistor Q-4 is coupled through resistance R-8 to the emitter of transistor Q-5 and through capacitance C-3 to ground. R-9 is connected between one base of transistor Q-5 and terminal 18A and resistance R-10 is connected between another base of transistor Q-5 to ground and through resistance R-11 to the base of transistor Q-11.

The base of transistor Q-9 is coupled through resistance R-20 to the collector of transistor Q-11, the emitter of which is grounded. The emitter of transistor Q-9 is coupled through resistors R-18 and R-16 to the emitter of transistor Q-8. The junction of transistors R-18 and R-16 is coupled through resistor R-17 to the collector of transistor Q-11, and to the collector of transistor Q-10. The base of transistor Q-8 is coupled through diodes D-7 and D-8 to the collector of transistor Q-10, the emitter of which is grounded. The base of transistor Q-10 is connected through resistance R-23 to ground and resistance R-22 to the collector of transistor Q-1 and through capacitor C-2 to ground. The base of transistor Q-7 is coupled through capacitance C-1 to ground and the collector of transistor Q-7 is grounded. The collector of transistor Q-6 is connected through diode D-4 to ground and to alternator/generator field winding input terminal 12A.

The charge current sense block is indicated in dotted lines at 17 and consists of diodes D-1 and D-5 and transistors Q-1, Q-2, Q-3 and Q-4 and their associated circuitry. The test pulse generator block is indicated at 19 in dotted lines and consists of diode D-6 and transistor Q-5 and their associated circuitry.

Voltage regulator block is indicated in dotted lines at 23 and consists of transistors Q-8 and Q-9, diodes D-7 and D-8, and their associated circuitry. The pulse enable block is indicated in dotted lines at 22 and consists of transistor Q-11. The charge enable block is indicated at 21 in dotted lines and consists of transistor Q-10 and its associated circuitry. The field current driver amplifier block 13 is indicated in dotted lines at 13 and consists of transistors Q-6 and Q-7 and diode D-4 and their associated circuitry.

OPERATION

Referring back to FIG. 1, and assuming a normal charging condition with an output from alternator 11 at terminal 11A, sufficient in amplitude to charge battery 18, the charge enable block will receive a charging signal from charge current sense block 17 due to the voltage drop across diode D-1 which in turn enables the voltage regulator which in turn enables field current driver amplifier 13 for sustaining current through field winding 12 of alternator/generator 11. If the output at terminal 11A drops in amplitude to the point where there is no conduction through diode D-1, the charge enable block 21 is disabled and test pulse generator 19 is enabled. With the charge enable block 21 disabled, the voltage regulator 23 turns off field current driver amplifier 13 and no field current is supplied to field winding 12 of alternator/generator 11. Periodically, a pulse from test pulse generator 19, which is typically two hundred fifty milliseconds in duration, is coupled to voltage regulator 23 through pulse enable block 22. This turns on the field current driver amplifier 13 which in turn supplies field current to field winding 12 of alternator/generator 11 for a period of two hundred fifty milliseconds. If during this period the output at terminal 11A is sufficient to create a charging current through diode D-1, this will be detected by charge block 21 which will turn on field current driver amplifier 13 through voltage regulator 23 and sustain current through field winding 12 which in turn will sustain charging current through diode D-1 for as long as the output at terminal 11A is of sufficient amplitude to maintain the positive charging current.

Here it is pointed out that voltage regulator 23 and field current driver amplifier 13 operate as a normal battery charger voltage regulator in the conventional sense. Diodes D-2 and D-3 determine the source of current for field winding D-12. In normal operation the current is supplied through diode D-2, i.e., when there is sufficient amplitude at output terminal 11A to maintain a charging current to battery 18. Where there is insufficient amplitude at output 11A to maintain charging current to battery 18, the field winding current is supplied directly from battery 18 through diode D-3 and field current driver amplifier 13. Diode D-2 also prevents current from flowing back into generator 11 if a generator rather than an alternator is used (an alternator is shown).

Referring back to FIG. 2, the operational details of the schematic diagram will be explained. Quiescently, assume the following conditions: Positive battery terminal 18A is at 12.6 volts relative to the negative ground terminal. Further assume that the alternator has just been brought up to a speed that would generate 14 volts at its output terminal 11A with the alternator field fully excited with 12 volts. However, initially transistor Q-6 is cut off and no field current flows so the alternator is not producing any voltage.

Terminal 11A and voltage $e_1$ are sitting at a voltage level below that at terminal 18A. The actual voltage is determined by the leakage zener voltage effect of the path through several transistors from the battery to the alternator. The current flow at this point is approximately 1 milliamp and hence can be ignored. In this condition the alternator output can be grounded without affecting the charge on the battery. Since voltage $e_1$ is less positive than voltage $e_2$, diode D-1 is not conducting. Transistors Q-2 and Q-3 form a differential amplifier that sees the voltage across diode D-1. Diodes D-5 and D-6 both drop about a half of a volt to the differential amplifier bases at voltages $e_3$ and $e_4$ shown as voltages $e_3$ and $e_4$ at the bases of transistors Q-2 and Q-3, so that transistors Q-2 and Q-3 will not have to go into hard saturation to turn on transistors Q-1 and Q-4. Diode D-5 also reduces the current flowing to the alternator in the event that its output at terminal 11A is grounded.

Resistors R-1 and R-2 form a voltage divider that places the base of transistor Q-2 slightly below the base of transistor Q-3 if voltages $e_1$ and $e_2$ are equal. So initially voltage $e_3$ is below voltage $e_4$ which means that transistor Q-3 is conducting and transistor Q-2 is cut off.

With transistor Q-2 cut off, no current flows through R-3 and transistor Q-1 is also cut off with no current flowing through resistor R-22. Hence, transistor Q-10 is also cut off. As will be seen below, Q-11 is also cut off so voltage $e_{13}$ is nearly equal to voltage $e_{12}$. Voltage $e_{12}$ is never more than one volt below the battery voltage of 12.6 volts, so voltage $e_{12}$ may be 12 volts. With voltages $e_{12}$ and $e_{13}$ equal, no current flows in transistor Q-8 of resistance R-14 so voltage $e_8$ is also at 12 volts. Hence, both transistors Q-7 and Q-6 are cut off with no current flowing through transistor Q-6 to the field winding of the alternator via terminal 12A. With no field current flowing, there is no alternator output at terminal 11A. Since there is no field current and most of the regulator currents are cut off as well, there is only a few milliamps flowing out of the battery to sustain the differential amplifier known as the charge current sense circuit.

Returning to the differential amplifier consisting of transistors Q-1, Q-2, Q-3 and Q-4, transistor Q-3 was conducting which caused the forward bias voltage to be developed across resistance R-5, putting transistor Q-4 in a conductive state. Initially, capacitance C-3 was discharged, but after applying the battery to the circuit at the outset with transistor Q-4 conducting, a small current flows through resistance R-8 which charges capacitance C-3 towards +12 volts. Transistor Q-5 is a unijunction transistor which stays off until emitter voltage $e_5$ exceeds the inter base voltage which typically happens at about 10 volts. At that time, which is typically 20 seconds later, transistor Q-5 exhibits the unijunction negative resistance effect and capacitance C-3 then discharges through resistance R-10. At this time a short pulse of about 250 milliseconds appears across resistance R-10 at voltage $e_{10}$ and is applied through resistance R-11 which causes current to flow into the base of transistor Q-11 which in turn renders it conductive and brings voltage $e_{13}$ down to essentially ground potential. With voltage $e_{13}$ at ground, transistors Q-8 and Q-9 operate as a differential amplifier. Voltage $e_7$ is a reference voltage established by diode D-8 which is a zener diode and diode D-7 (a forward bias diode for temperature compensation). Voltage $e_7$ is compared with voltage $e_6$ with $e_6$ being derived from a voltage division from voltage $e_2$ such that the differential amplifier consisting of transistors Q-8 and Q-9 is balanced when voltage $e_2$ is about 14 volts, the normal charging voltage for a 12-volt battery. Since voltage $e_2$ is below 14 volts, transistor Q-9 is cut off and transistor Q-8 is conductive which causes current to flow in transistor Q-7 where it is amplified, causing a greater current to flow in transistor Q-6 which in turn turns on and saturates supplying nearly +12 volts to the field to output terminal 12A.

Assume the above quiescent condition, this field current is sufficient to cause the alternator to produce a charging voltage of over 14 volts at output terminal 11A.

With voltage $e_1$ more than one-half volt above voltage $e_2$, transistor Q-2 is now conductive and transistor Q-3 is cut off. With transistor Q-2 conducting, transistor Q-1 will be rendered conductive with current flowing through resistance R-22 to render transistor Q-10 conductive. Capacitance C-2 keeps transistor Q-10 conductive between alternator cycles in case the alternator has a high ripple content in the output at terminal 11A. Transistors A-10 being conductive, also renders voltage 13 at ground potential and this charging condition will persist until voltage $e_1$ drops down to less than one-half volt positive relative to voltage $e_2$. Meanwhile, with transistors Q-3 cut off, transistor Q-4 is also cut off and no current flows in resistance R-8 so capacitance C-3 is not being charged and its potential remains below the inter base voltage necessary to fire transistor Q-5. Hence, no current pulses appear through resistance R-10 so transistor Q-11 does not receive any turning on pulses at its input.

In this condition, the voltage regulator becomes active which consists of the differential amplifier transistors Q-8 and Q-9. As long as the battery is in need of the full charging rate, voltage $e_2$ will be below +14 volts and transistor Q-9 will be cut off with transistor Q-8 conductive, keeping transistors Q-7 and Q-6 conductive with the full field current being applied to the alternator.

If no load is applied to the battery, the battery charging requirement will diminish and a voltage of +14 volts at voltage $e_2$ can be maintained with less then the full alternator output. As voltage $e_2$ approaches 14 volts, transistor Q-9 begins to conduct, taking some of the current flowing through resistance R-17 from transistor Q-8. This reduces the current through resistance R-14 and voltage $e_8$ rises toward +12 volts. This is carried through emitter follower transistor Q-7 to reduce the voltage across resistance R-13 which in turn reduces the current driving transistor Q-6 until it also comes out of saturation and the field voltage drops to the value that provides just enough field current for the alternator to sustain the battery voltage at +14 volts.

If the alternator slows down in speed it requires more field current to maintain the battery and +14 volts. If the alternator is allowed to slow down to a stop, there will be a point where even though the full field voltage is applied, the voltage at terminal 11A falls to less than a half a volt above the battery voltage of +12.6 volts. At this point, transistor Q-2 is turned off and it in turn causes voltage $e_{13}$ to rise again which turns off transistors Q-7 and Q-6 and the field current is removed from the alternator. At the same time, transistor Q-3 is turned on again, turning on transistor Q-4 and capacitor C-3 begins to charge. After about twenty seconds capacitance C-3 is again discharged by transistor Q-5 which causes voltage $e_{13}$ to be grounded for about two hundred fifty milliseconds. However, the alternator is not turning at this time so voltage $e_1$ does not come up to voltage $e_2$ and transistor Q-2 remains cut off which holds transistor Q-1 and transistor Q-2 cut off during the 250 millisecond pulse. At the end of the pulse, voltage $e_{13}$ again rises and the field current is off during the next twenty seconds. At the end of that time another test pulse is given and the conditions repeat themselves. It is noted here that with the alternator not turning, the average current is approximately 1/80th of the normal field current which reduces the non-turning alternator drain by that amount.

Also, it is pointed out that field current is derived from either the alternator or the battery, depending upon which is at a higher voltage. If there is no alternator output, then voltage $e_2$ will be higher and field current for the test pulse period will flow from the battery to diode D-3. If the alternator is producing a higher voltage than the battery, then voltage $e_1$ will be higher and the field current will flow through diode D-2 which means diode D-3 will not have enough forward drop for current to flow through it. In the charging condition with diode D-3 cut off, the alternator supplies the field and regulator currents directly through diode D-2 without using battery current.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:
1. A source sensing battery charger comprising:
an electrical generating means coupled to a battery through a charge current sensing means;
a field current electrical source for supplying electrical current to the field winding of said generating means;
disabling means coupled between said charge current sensing means and said field current electrical source means operable for disabling said field current electrical source means when a zero charging current condition exists between said generating means and said battery; and
interrogating means coupled between said charge current sensing means and said field current source means for periodically enabling said field current source means, whereby when said field current source means is enabled by said interrogating means, and if a charging current exists between said generating means and said battery and said disabling means being operable to sustain enabling of said field current source means.

2. The source sensing battery charger means of claim 1 wherein said interrogating means comprises:
a test pulse generator.

3. The source sensing battery charger means of claim 1 wherein:
said charge current sense means senses a voltage drop across a diode.

4. The source sensing battery charger means of claim 1 wherein:
said field current source means is supplied by an output from said generator means during charging periods and by an output from said battery during non-charging periods.

* * * * *